United States Patent
Maddox

(10) Patent No.: US 7,346,473 B2
(45) Date of Patent: Mar. 18, 2008

(54) METHOD AND SYSTEM FOR PROVIDING PERFORMANCE ANALYSIS USING FUZZY LOGIC

(75) Inventor: Michael David Maddox, Colorado Springs, CO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 81 days.

(21) Appl. No.: 11/171,838

(22) Filed: Jun. 30, 2005

(65) Prior Publication Data

US 2007/0005545 A1    Jan. 4, 2007

(51) Int. Cl.
  *G06F 15/00* (2006.01)
  *G06N 5/02* (2006.01)
(52) U.S. Cl. ............ 702/182; 702/183; 706/47
(58) Field of Classification Search ......... 702/182, 702/183, 186; 706/1, 9, 10, 52, 47; 704/1, 704/3; 379/113, 134; 709/223, 224
See application file for complete search history.

(56) References Cited

U.S. PATENT DOCUMENTS 6,208,721 B1 *  3/2001  Feinberg et al. ........... 379/134

2003/0018592 A1 *  1/2003  Srinivasa et al. ............. 706/8
2005/0021212 A1 *  1/2005  Gayme et al. ................ 701/99

OTHER PUBLICATIONS

Zadeh, L., "Fuzzy sets," *Information and Control* 8:338-353, 1965.
Clyde V. Moseberry and Chi-Haur Wu, "Dynamic Performance Tuning in a UNIX Environment: A Collaborative CMAC Design," *CMG Proceedings* 2002.
Zadeh, L. A. (1975) "The concept of a linguistic variable and its application to approximate reasoning," Part 1. *Information Sciences*, 8:199-249.
Zadeh, L. A. (1975) "The concept of a linguistic variable and its application to approximate reasoning," Part 2. *Information Sciences*, 8: 301-357.
"ITU-T Recommendation H.323: Packet-Based Multimedia Communications Systems", International Telecommunication Union, Jul. 2003, 297 pages.

* cited by examiner

*Primary Examiner*—Bryan Bui

(57) ABSTRACT

A fuzzy telecommunications performance analysis system for analyzing performance of a telecommunications system is disclosed. A performance analyzer analyzes the performance of telecommunications systems and resources (e.g., switches, processors, memories, I/O devices, etc.) by collecting system and resource performance data, fuzzifying the data, computing and combining linguistic variable values using values of membership functions and fuzzy logic operators, and defuzzifying the results for analysis.

19 Claims, 10 Drawing Sheets

METHOD AND SYSTEM FOR PROVIDING PERFORMANCE ANALYSIS USING FUZZY LOGIC

FIELD OF THE INVENTION

The present invention relates to performance analysis and more particularly to performance analysis using fuzzy logic of computing systems and telecommunication systems.

BACKGROUND OF THE INVENTION

A common problem in telecommunications systems, and in computer systems generally, is determining how to analyze the performance of a system or of particular resources, such as switches, processors, servers, and the like. For example, it may be desirable to determine whether particular resources, such as server resources in heavily burdened call centers, are overutilized or underutilized, so that decisions may be made regarding tuning of the system and the resource. As systems and resources have become more complex over time, involving many different resources interacting with each other, and thus many parameters that may affect performance, a simple test to determine whether a system or a particular resource is at a level approaching failure is no longer adequate to assure a level of functionality to satisfy the needs of users.

System administrators have conventionally used ad hoc techniques gleaned from their experiences with system performance over time to manually adjust resources, for example, by replacing older components with newer, faster or more efficient components. As the complexity and size of the systems evolve, the system administrators are overwhelmed by the daunting task of determining the individual performance parameters of the multitude of the network and computing resources as well as their collective performance measure. One problem associated with such a manual process is a difficulty in distinguishing whether separate resources may be approaching a critical state, which needs adjustment, given the magnitude of the amount of data under consideration. Another problem lies in the possibility that a group of interrelated resources are performing adequately when viewed as individual resources, but may be approaching a critical level when evaluated as a more complex configuration of interrelated resources functioning as an entity.

Therefore, there is a need for a more efficient method and system for performance analysis of systems.

SUMMARY OF THE INVENTION

These and other needs are addressed by the present invention, which analyzes performance of systems and resources using fuzzy logic.

In accordance with an embodiment of the present invention, a method for analyzing performance of a system including at least one resource is provided. The method comprises receiving performance data associated with the resource; determining fuzzified performance data based on the received performance data; and determining linguistic variable values associated with the resource.

In accordance with another further embodiment of the present invention, a device for analyzing performance of a system including a plurality of resources is provided. The device comprises a performance analyzer configured to receive performance data associated with each one of the plurality of resources, determine fuzzified performance data based on the received performance data, and determine linguistic variable values associated with the plurality of resources. A performance analyzer interface is configured to interface with the system and the performance analyzer.

In accordance with yet another embodiment of the present invention, a performance analyzer comprises means for receiving performance data associated with the resource; means for determining fuzzified performance data based on the received performance data; and means for determining linguistic variable values associated with the resource.

In accordance with yet another embodiment of the present invention, a fuzzy telecommunications performance analysis system for analyzing performance of a telecommunications system including at least one call center, each call center including a plurality of resources, is provided. The performance analysis system comprises a performance analyzer configured to receive performance data associated with each one of the plurality of resources, determine fuzzified performance data based on the received performance data, and determine linguistic variable values associated with the plurality of resources. A network management system is configured to interface with the call center and the performance analyzer.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for analyzing performance data of a telecommunications system using fuzzy logic are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1A:
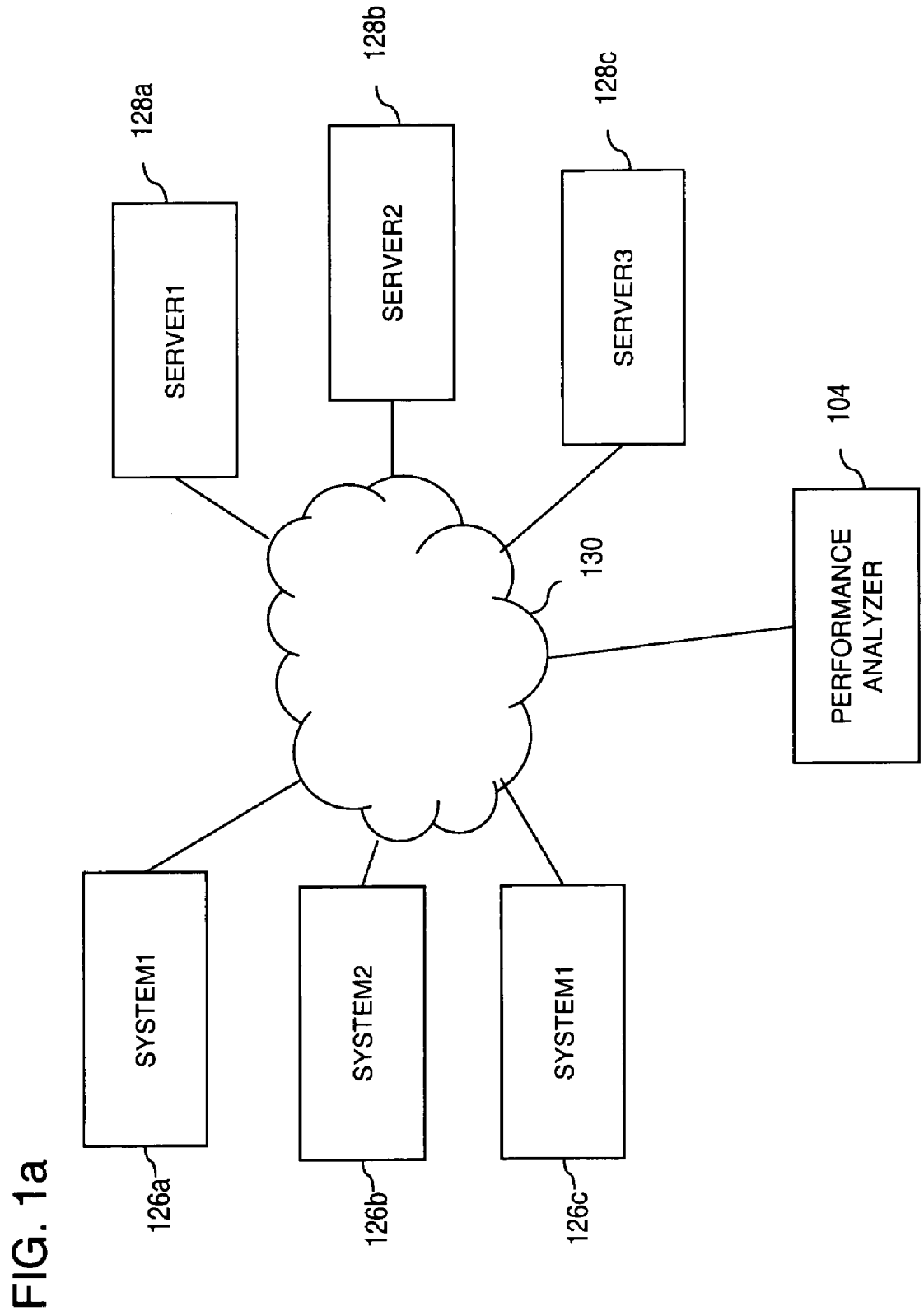
FIG. 1a depicts a telecommunications system with a performance analyzer that can be used to implement an embodiment of the present invention.

FIG. 1a depicts a network system which includes a network 130 in communication with a performance analyzer 104 for analyzing performance of any number of resources in communication with the network 130 or the performance analyzer 104 using fuzzy logic in accordance with methods and systems consistent with the present invention. The network 130 is in communication with systems 126a, 126b, and 126c, and server 128a, 128b, and 128c. One skilled in the art of data processing will understand that the network 130, or the performance analyzer 104, may be communicatively connected to any number of other systems or resources which may be monitored for using the performance analysis consistent with methods and systems consistent with the present invention.

Figure 1B:
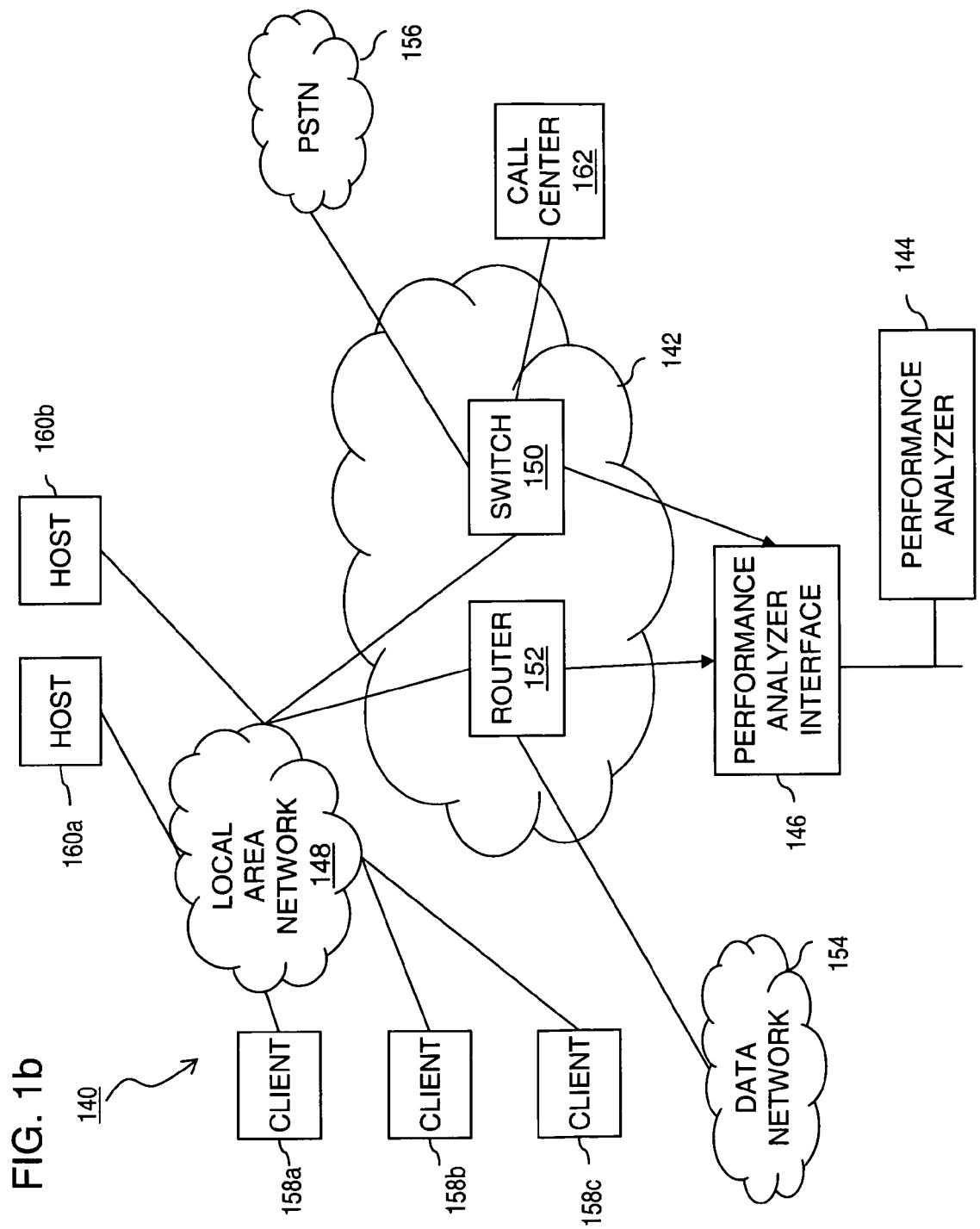
FIG. 1b depicts a telecommunications system with a performance analyzer that can be used to implement an embodiment of the present invention.

FIG. 1b depicts a telecommunications system 140 which includes a performance analyzer interface 146 in communication with a performance analyzer 144 for analyzing performance of the system 140 using fuzzy logic in accordance with methods and systems consistent with the present invention. The performance analyzer 144, in an exemplary embodiment, analyzes the performance of the system 140 and the associated resources (e.g., switches, processors, memories, Input/Output (I/O) devices, etc.) by collecting system and resource performance data, fuzzifying the data, computing and combining linguistic variable values using values of membership functions and fuzzy logic operators, and defuzzifying the results for analysis.

Fuzzy logic, also known as approximate reasoning, is an artificial intelligence technology originated in the 1960s by Lotfi Zadeh. A type of logic based on partial set memberships was introduced in Zadeh, L., "Fuzzy sets," *Information and Control* 8:338-353, 1965. Since its introduction, fuzzy logic has been applied in many areas, including control systems. For example, in 1973 fuzzy logic was applied to control startup of a steam engine. Most algorithms developed to that point overshot the desired revolutions per minute (RPM), caused oscillations in RPM, or were too sluggish, as there were four separate variables to control. An algorithm developed by Ebrahim Mamdani et al. accelerated the steam engine to its target RPM at an optimal rate and with no overshoot or oscillation. Fuzzy logic has also been applied widely in other control systems used in products, for example, in focusing mechanisms for digital camera lenses.

Traditional, or binary, set membership typically assumes that a given element (e.g., a number, a name, a person, etc.) is either a member of a set or it is not a member of the set. In mathematical terms, the membership of a given candidate is a binary function, namely 0 or 1. In a typical system using fuzzy logic, set memberships take on values from 0.0 to 1.0. Thus, an element's membership is not limited to a simple yes or no result, but may be measured on a scale from 0.0 to 1.0.

As an example of an area of fuzzy logic, in a particular neighborhood, there may exist a through street which bisects a residential section, and the speed limit may be established at 30 miles per hour. Occasionally, police may scan the traffic with radar, garnering a quantity of speeding citations. Cautious drivers aware of the radar enforcement may observe the speed limit scrupulously. However, a particular driver may adjust his speed, more or less unconsciously, by a function that incorporates the time of day (e.g., by assuming less radar enforcement at night), the time elapsed since the last visit by a policeman (e.g., longer time, less caution), his own degree of need for speed, and so forth. The result is a smooth function, with a speed that varies from 29 to 36 miles per hour (mph).

As a further example of fuzzy logic from the realm of driving, a driver driving on a highway may envision an imaginary target line down the center of the lane, with a zone of acceptability on each side. The further the car drifts from that zone, the more steering correction one applies. Again, the function is smooth, not discontinuous. Neither of these examples is very amenable to binary, yes/no logic. If one were to try using it, the most economical solution would approximate the behavior described.

Figure 3:
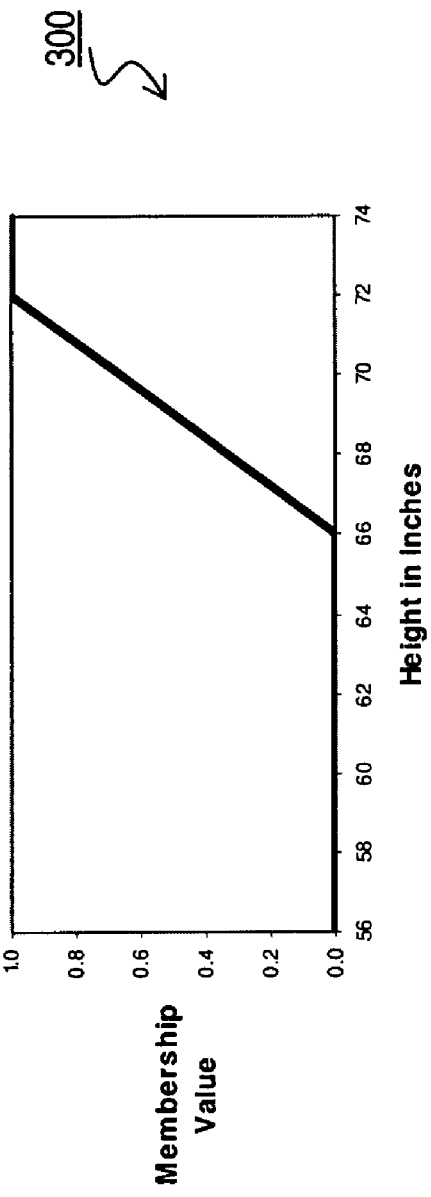
FIG. 3 depicts a graph illustrating an exemplary fuzzy logic membership function.

As yet another example, the concept of "tall" for a human lends itself naturally to fuzzy logic. There is no point at which a person is considered to be tall; however, the concept translates into a smooth function. Typically, "tall" is in the eye of the beholder, as it typically involves a subjective assessment. For many humans, a graph of a membership function TALL(x), where x is the height in inches, may take the form of the graph 300 depicted in FIG. 3. As shown in FIG. 3 the value of the membership function is 0.0 up to 5 feet 6 inches (i.e., 66 inches), at which point it rises linearly to 1.0 at 6 feet 0 inches (i.e., 72 inches). In this example, the membership function is linear between key points. According to the needs of the problem, one can use a linear ramp, a half-sinusoidal (i.e., smooth) curve, or other suitable shape. One aspect of fuzzy logic is that the choice of membership function is flexible. With careful choice of start and end points, a linear ramp can approximate a quarter-sine curve with an error of a few percent. The linear ramp may be more desirable, because it may require fewer machine cycles to calculate, thus offering more speed and efficiency.

With respect to a given variable that is being evaluated, the range of values it can take on is called the "universe of discourse."

Fuzzy logic actually gives the same results as binary logic when the set membership of an element is limited to the values 0 and 1. However, using fuzzy logic, the degree of set membership, or values in the range of 0.0 to 1.0, is assigned using a membership function. A membership function takes a value, such as temperature, or height, or traffic flow, or CPU utilization, and maps its range to a set of values from 0.0 to 1.0.

Resource tuning in a Unix environment using neural networks has been described in Clyde V. Moseberry and Chi-Haur Wu, "Dynamic Performance Tuning in a UNIX Environment: A Collaborative CMAC Design," CMG Proceedings 2002. A node of a neural network is similar to a linguistic variable in fuzzy logic. A group of numerical inputs (corresponding to linguistic variables) is presented to the node with varying weights. A bias is applied to the node, corresponding to a fuzzy logic threshold test. However, a neural network differs significantly from a set of fuzzy logic operations, as fuzzy logic has no equivalent to the middle layer(s) of nodes in a typical neural network. Middle layers of neural networks incorporate the weights and thresholds evolved in training cycles, which is a necessity absent from fuzzy logic.

As seen in FIG. 1b, the performance analyzer interface 146 is in communication with a core network 142 which includes a switch 150 and router 152, which are in communication with a local area network 148. The switch 150 is communicatively connected to a call center 162. One skilled in the art of telecommunications will understand that the call center 162 may include any number of servers, systems, and the like, for which performance analysis using the fuzzy logic described herein may be desirable. The local area network 148 is communicatively connected to clients 158a, 158b, 158c, and hosts 160a and 160b. The switch 150 is communicatively connected to a public switched telephone network (PSTN) 156. The router 152 is communicatively connected to a data network 154.

An exemplary call center may house a number of agents who handle incoming telephone calls or place outbound telephone calls. Call centers are often used for telemarketing, reservation centers, sales calls, customer services, technical support, and the like. Each agent in a call center has an associated station that typically includes a personal computer or workstation, a phone keypad and a headset. The workstation is most often used to access information in a database pertaining to the calls being handled by the agent. For example, the workstation may provide views of account information or contact information pertaining to a customer whom the agent engages on the phone. Where a call center is used for accepting orders for goods or services, the workstation may provide information on the availability and the pricing of a product. The agent may use the information retrieved from the database to help a caller. The agent may accept information from a caller for entry into the database.

In addition to a database shared by the agents, a call center may include an automatic call distributor (ACD) for channeling or routing calls to available agents. In large call centers, the agents are often organized into groups and have associated supervisors who are responsible for managing and overseeing the agents. To assist in effective management of call center resources, supervisors are usually provided with real-time statistics pertaining to the operation of the call center, such as the number of calls on hold, wait times being experienced, and the number of abandoned calls. Communications service providers may offer large business enterprises the ability to share call center operations among multiple geographically dispersed call centers. In particular, network-resident call handling technologies, such as intelligent network services platforms, have been developed for performing some of the handling and queuing of each inbound call within the communications network.

Data communications systems are generally capable of supporting telephony services, for which performance monitoring of resources and systems in accordance with an exemplary embodiment of the present invention may be desirable. A communication system may include packet data transport networks, which may be Internet Protocol (IP) based networks. Data communications systems provide the ability to establish communications among various terminal equipment coupled thereto, such as telephones, PBX phones and session initiation protocol (SIP) phones. In practice, there may be thousands or millions of such terminal devices served by one or more systems.

Further, data communications systems are able to support large enterprise customers who maintain multiple locations having telephony and data transport requirements.

For example, customer sites may include data communications equipment, namely local area networks (LANs), SIP phones, and PC clients. At each customer site, an enterprise gateway may be provided to allow users at telephones through PBXs to readily make calls to and receive calls from users of SIP phones and PC clients.

A gateway is a device that allows divergent transport networks to cooperatively carry traffic. A gateway often provides for interoperation at two levels—between different signaling schemes and between different media forms. For example, a network gateway may adapt between the SS7 signaling of a telephone network and SIP or H.323 protocols used by the data network. At the same time, the network gateway may adapt analog or PCM-encoded voice signals in a telephone bearer channel to a packetized data streams suitable for transport over a data network.

Enterprise gateways adapt between PBX signals and data signals for transport over a data network such as a local area network (LAN) or the service provider's network. As a signaling interface to a PBX, an enterprise gateway may use Integrated Digital Services Network (ISDN), Circuit Associated Signaling (CAS), or other PBX interfaces (e.g., European Telecommunications Standards Institute (ETSI) PRI, R2). As an example, an enterprise gateway may provide connectivity from a PBX, which contains trunks or lines often for a single business customer or location (e.g., PBX phones). Signaling for calls from the PBX into the IP network comprises information which uniquely identifies the customer, trunk group, or carrier. This allows private numbers to be interpreted in their correct context.

By virtue of a service provider's data network, any of the users at a customer site may readily communicate with those at another customer site. A data network may also be coupled to the public Internet, opening the possibility that communications might be established with PC clients, or the like, that are not within either customer site.

Each element of any of the systems described above may be regarded as a system or resource for which it may be desirable to monitor activities and analyze the performance using the methods and systems as described herein. For example, switches may have traffic flows which require analysis to ensure that loads are balanced efficiently, servers may receive different types of processing requests for which the servers' resources (e.g., CPU, memory, etc.) may need analysis to ensure a more efficient use of the resources, for example, to avoid a shutdown from a resource's becoming "too busy" or too overutilized to function appropriately.

The examples that follow assume a daily reporting cycle; data collected from a large number of servers, perhaps thousands, is aggregated and processed into reports. The performance analyst requesting the reports needs a handle on what has been happening and has a limited amount of time to "get the picture." One skilled in the art of data processing will understand that data may be collected at varying frequencies, for example, data may be collected every fifteen minutes, every hour, etc.

Figure 2:
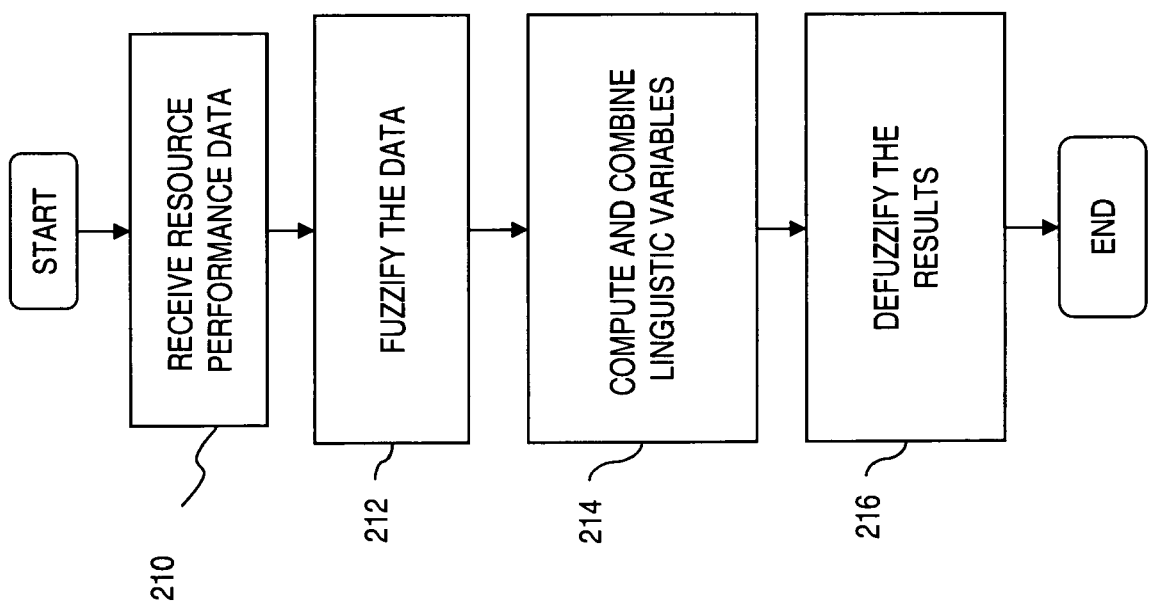
FIG. 2 is a data flow diagram of exemplary steps that may be performed by an exemplary performance analyzer in accordance with an embodiment of the present invention.

FIG. 2 depicts a flow of steps for performance analysis of a system or resource by processing performance data in accordance with methods and systems consistent with the present invention. After starting, at step 210, resource performance data is received for analysis. At step 212, the data is fuzzified, for example, by computing membership values of fuzzy sets associated with the data, by using membership functions. At step 214, linguistic variables are computed and combined. These variables may be combined, for example, using any combination of fuzzy equivalents of logical AND, OR, and NOT operators to the linguistic variables, or membership values. At step 216, the results are defuzzified for analysis, for example, by extracting the end results of the operations.

Accordingly, a system, method, and software for analyzing performance data of a telecommunications system using fuzzy logic advantageously enables automated performance evaluation of batches of tests which obtain performance data for a large number of devices (e.g., server boxes, routers, and the like). Fuzzy membership functions, which may include hedge functions, are applied to the performance data, thereby eliminating the need for hard cut-off values, and eliminating or minimizing a need for human intervention.

In order to combine values of fuzzy logic, operators similar to set theory operators were introduced by Zadeh. The original fuzzy logic operators proposed by Zadeh are shown in Table 1 below.

TABLE 1

| Truth(A OR B) | MAX(truth(A), truth(B)) |
| Truth(A AND B) | MIN(truth(A), truth(B)) |
| Truth(NOT A) or complement operator | 1.0-truth(A) |

Using these operators, if Truth(A) and Truth(B) take on 0 and 1 values, the results are the same as with binary logic, and thus fuzzy logic researchers refer to this as the Extension Principle. Other sample values may be inserted to arrive at results that appear very intuitive. For example, if Truth(x) is 0.6 and Truth(y) is 0.3, then Truth(x OR y) is 0.6. Fuzzy value inputs thus produce fuzzy value outputs. Further, Truth(x AND y) is 0.3. The fuzzy complement, Truth(NOT x) is 0.4. A number of other fuzzy logic operators have been proposed and used successfully in various situations.

Fuzzy logic builds on an intuitive base. For example, the concept of hedge functions uses terms with which humans are already familiar, such as "very", "usually", "mostly", and "seldom", and translate them into arithmetic manipulations of membership values.

Figure 4:
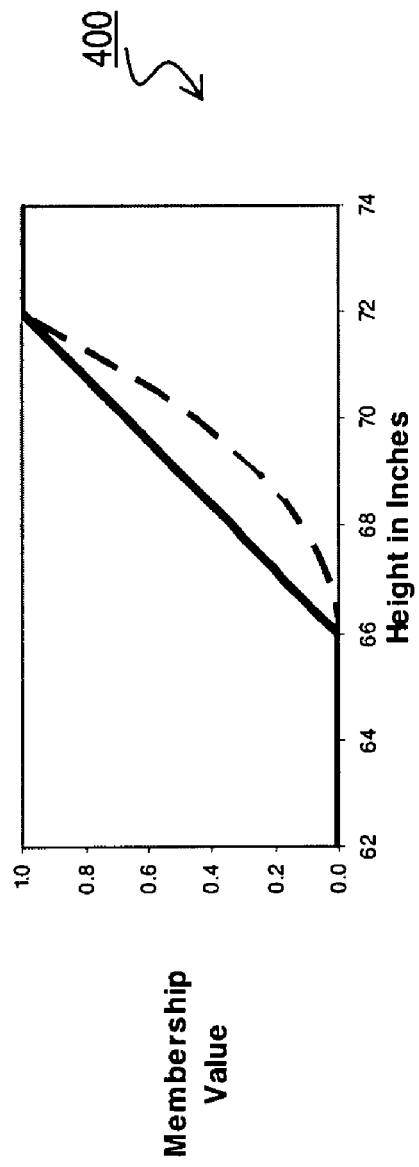
FIG. 4 depicts a graph illustrating an exemplary fuzzy logic hedge function.

For example, an exemplary definition of VERY(x) is $x^2$. An exemplary graph 400 of FIG. 4 shows the hedge function VERY(TALL(x)) as a lighter, broken line along with TALL(x).

Figure 5:
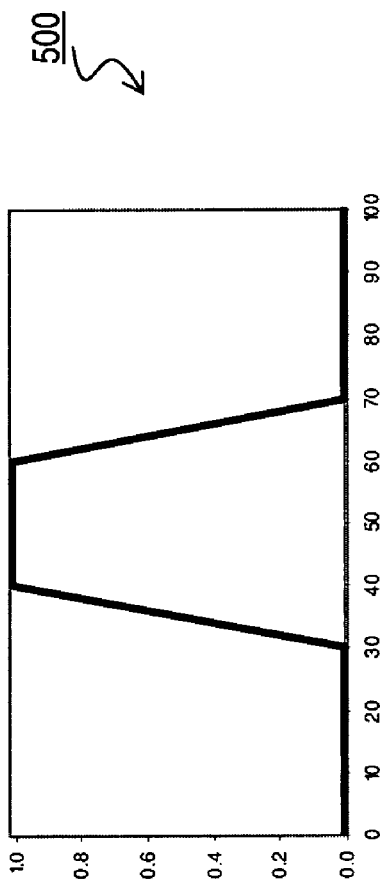
FIG. 5 depicts a graph illustrating an exemplary percentage variable.

For brevity and easier visualization, the discussion that follows relies, for purposes of exemplary illustrations, on graphs of membership functions. Many of the membership functions used conform to portions of a trapezoidal or plateau shape with four inflection points. As an example, FIG. 5 depicts a graph 500 of a percentage variable.

For ease in discussing these graphs, portions of the following discussion that deal with this type of graph simply refer to the inflection points by the name "ascending toe" (i.e., 30 in the exemplary graph 500), "ascending shoulder" (i.e., 40 in the exemplary graph 500), "descending shoulder" (i.e., 60 in the exemplary graph 500), and "descending toe" (i.e., 70 in the exemplary graph 500). The ascending shoulder and the descending shoulder may be at the same value of the input variable, resulting in a graph with a spiked or triangular appearance. Many functions utilize only two of the four possible points. This type of abstraction of the membership function shape advantageously aids in generalizing code that implements membership functions.

The concept of possibility as used in fuzzy logic is not equivalent to probability. Probability refers to an event in the future whose outcome is unknown. Possibility, in fuzzy logic terminology, refers to the mapping of known values from the universe of discourse to membership values; a membership function determines the extent to which a known event occurred in the past.

It is with the use of linguistic variables and combinations of them that the power of fuzzy logic blossoms fully. In Zadeh, L. A. (1975) "The concept of a linguistic variable and its application to approximate reasoning," *Parts 1 and 2. Information Sciences,* 8:199-249, 301-357, a linguistic variable is defined as "A variable whose values are words or sentences in a natural or artificial language." For example, in a performance context, a server may be referred to as "CPU-saturated" or the CPU may be referred to as "underutilized." Not everyone may agree on an exact definition, but there typically exists some intuitive sense of what is meant.

Fuzzy logic enables a natural approach to working with these concepts. More importantly, it is possible to combine the concepts in ways they are used in ordinary conversation, but enabling a computer to operate on these concepts at very high speeds.

Figure 6:
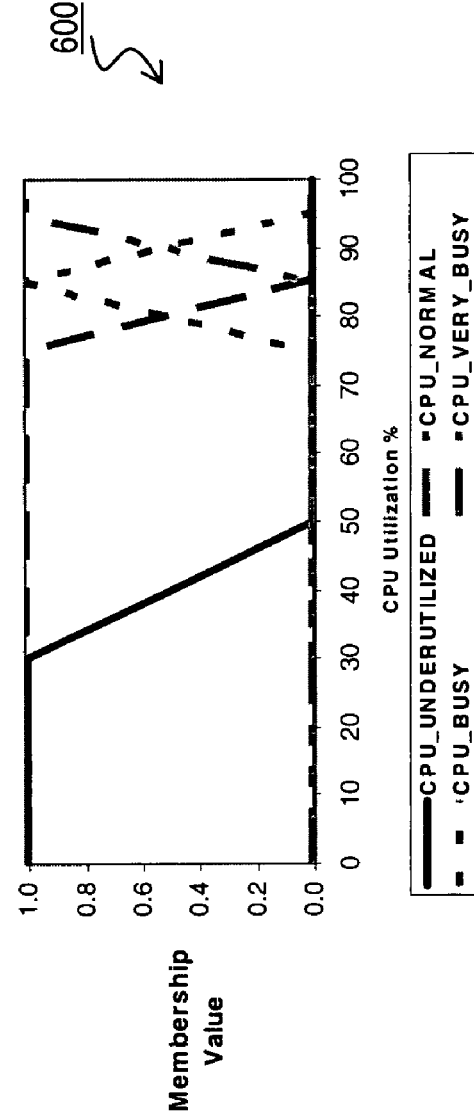
FIG. 6 depicts a graph illustrating exemplary CPU-related linguistic variables in accordance with an embodiment of the present invention.

As an example, four exemplary CPU-related linguistic variables, CPU_UNDERUTILIZED, CPU_NORMAL, CPU_BUSY, and CPU_VERY_BUSY are shown in a graph 600 of FIG. 6.

As shown in graph 600, an exemplary descending shoulder of CPU_UNDERUTILIZED is at 30% CPU utilization and a descending toe is at 50%. A descending shoulder of CPU_NORMAL is at 75% and a corresponding toe is at 85%. An ascending toe of CPU_BUSY is at 75%, both shoulders are at 85% utilization and a descending toe is at 95%. Further, an ascending toe of CPU_VERY_BUSY is at 85% and an ascending shoulder is at 95% utilization.

It is noted that there is a distinction between the use of the VERY hedge function described above and the exemplary linguistic variables described herein, such as CPU_VERY_BUSY.

Once the relevant linguistic variables are defined, they can be combined in intuitive ways in order to pose questions regarding performance characteristics and receive answers very quickly. Assuming an MS-Windows realm, an exemplary schematic formula my be created such as:

MEM_ISSUE=MEM_SHORT AND PAGING_HIGH

In other words, a Windows resource may have a memory issue to the extent that there is a shortage of memory and a high paging rate. All that is needed to resolve the formula is to define the MEM_SHORT and PAGING_HIGH variables (e.g., with MS-Windows, available memory and the virtual memory hard page fault rate may be tested together for a full picture of memory usage. Similar tests may be applied for analyzing Unix performance and the performance of other systems).

Defuzzifying is the step of taking the combined linguistic variables and converting them into firm, non-fuzzy outputs, called crisp variables, control signals, or decisions. This step may include a simple threshold test (e.g., choose to report all systems with MEM_ISSUE greater than 0.3) or it may involve more complicated math (e.g., derive a specific amount to adjust one or more tuning parameters).

A common scenario for one skilled in the art of performance analysis is the problem of how to interpret a spreadsheet or statistical analysis system (SAS) data set full of performance variables, sampled on (for example) 1-minute intervals from a single server for several hours in order to analyze performance reasonably. Or, by the same token, the spreadsheet may contain 10-day means of a dozen performance variables for hundreds of machines. The problem may involve isolating the "worst" machines (or samples) from the bunch. A question that may be asked is "what thresholds (e.g., cut-offs) does one apply?" Other questions may be posed such as, "does one set the CPU utilization threshold at a mean of 85%? What about a machine with a mean of 84%? Should it be forced off the list arbitrarily?" In reality, is it not likely that such an arbitrary decision is desirable. As discussed below, scenarios such as these lend themselves to linguistic variables in a powerful way. Fuzzy logic may then be used as a more powerful tool than conventional thresholds for filtering.

Using fuzzy logic, the various performance statistics may be combined using familiar terms used in conversation. A threshold may be established for each linguistic variable under consideration, such as MEM_ISSUE, as discussed previously. Once it is roughly determined how many samples or servers fall above the chosen threshold, the threshold may be adjusted to reveal the number of items to consider.

Using fuzzy logic in this way, versus setting hard thresholds for resources such as memory, CPU, and other performance statistics and using those for reporting machines that are out-of-specification, advantageously yields considerable flexibility. For example, conventionally, the IF-THEN-ELSE constructs in almost any programming language may become very cumbersome when more than two or three threshold tests are applied. Programming may become difficult, in that it is cumbersome to keep track of all the combinations that have been programmed in, to ensure that all needed combinations have been coded, and still worse, to maintain the logic over time. In contrast, by using fuzzy logic, set membership values may be created mathematically, combined mathematically, and the results may be extracted mathematically-all in a logic flow that is much more of a straight line.

Figure 7:
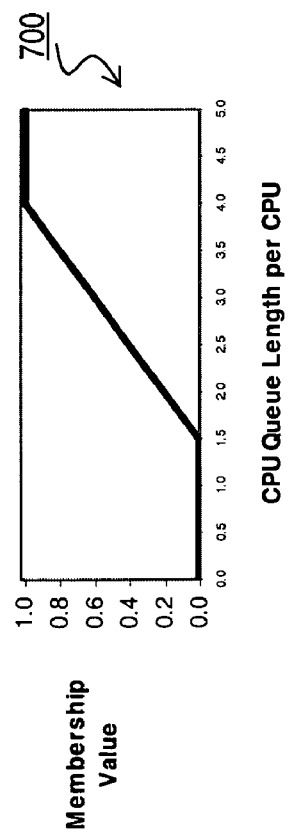
FIG. 7 depicts a graph illustrating an exemplary linguistic variable relating to CPU queues in accordance with an embodiment of the present invention.

As a continuation in building on the linguistic variables, or performance characterizations, described above, an exemplary graph 700 of FIG. 7 depicts CPU_QUEUE_LONG. The toe and shoulder values for this example, 1.5 and 4.0, may be subject to change as a user continues to apply fuzzy logic.

Figure 8:
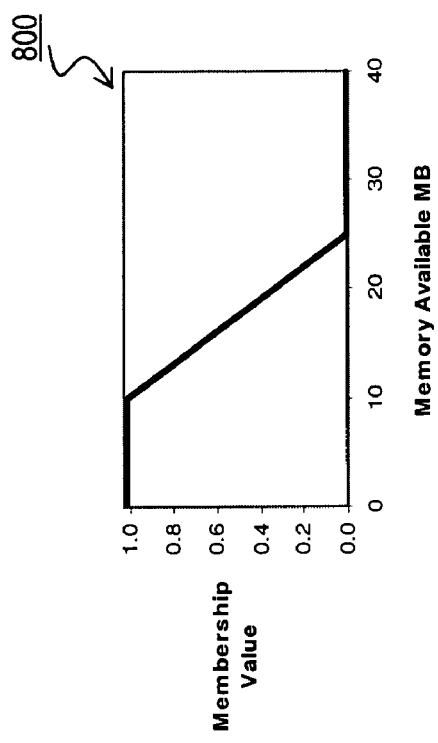
FIG. 8 depicts a graph illustrating an exemplary linguistic variable relating to memory in accordance with an embodiment of the present invention.
Figure 9:
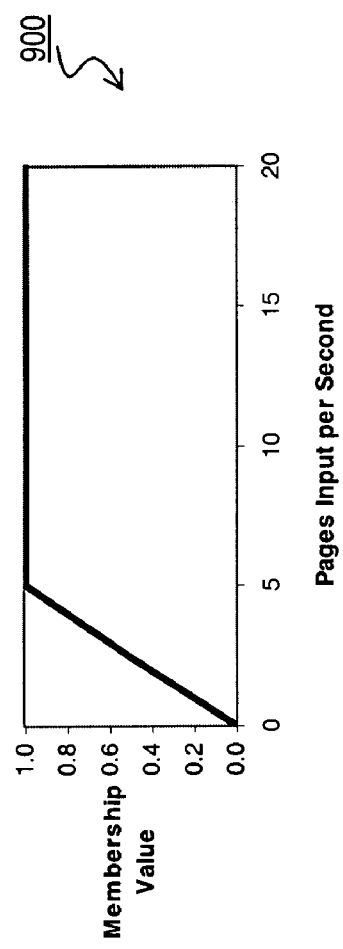
FIG. 9 depicts a graph illustrating an exemplary virtual memory paging rate.

Next, MEM_SHORT (as seen by the MS-Windows performance analyst) is shown in a graph 800 of FIG. 8. Typically, a measurement of available memory alone is not trustworthy for analyzing the whole picture of memory performance, as it may be desirable to factor in the virtual memory paging rate (e.g., hard page faults) as shown in a graph 900 of FIG. 9.

Figure 11:
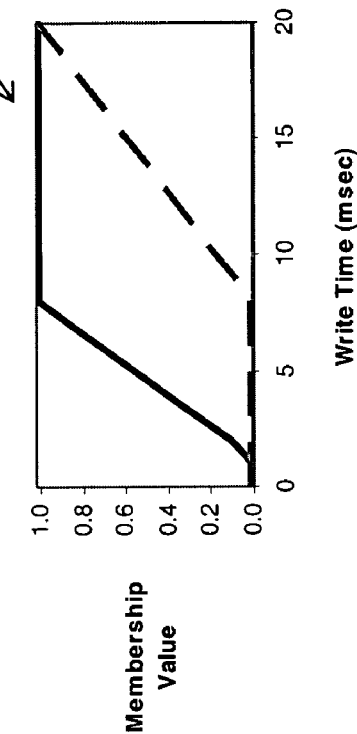
FIG. 11 depicts a graph illustrating an exemplary linguistic variable relating to disk writes in accordance with an embodiment of the present invention.
Figure 10:
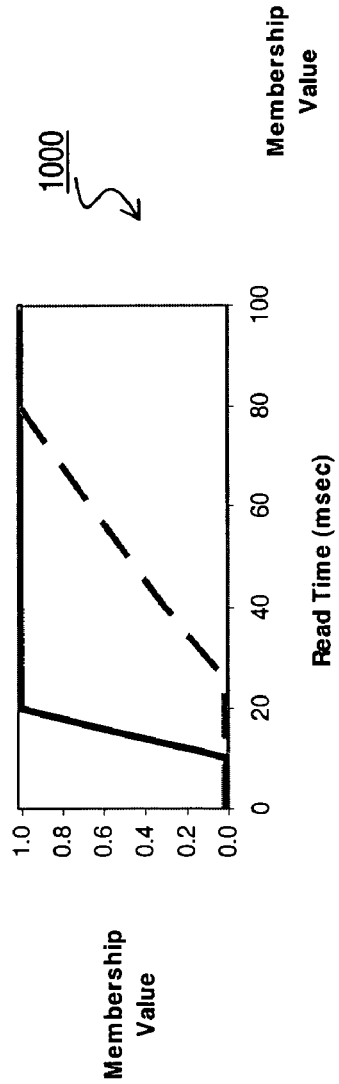
FIG. 10 depicts a graph illustrating an exemplary linguistic variable relating to disk reads in accordance with an embodiment of the present invention.

For disk I/O, it is desirable to factor in several variables. An exemplary graph 1000 of FIG. 10 depicts an exemplary READS_SLOW (i.e., as shown by a solid line) and READS_VERY_SLOW (i.e., as shown by a broken line), based on direct attached storage with a suitable cache controller. Similarly, for writes it is desirable to factor in several variables. An exemplary graph 1100 of FIG. 11 depicts an exemplary WRITES_SLOW, (i.e., as shown by a solid line) and WRITES_VERY_SLOW (i.e., as shown by a broken line).

Figure 12:
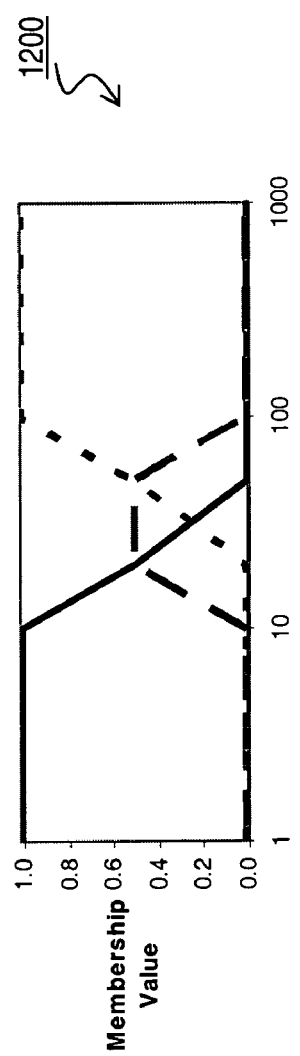
FIG. 12 depicts a graph illustrating a trio of overall disk I/O level variables in accordance with an embodiment of the present invention.

Further, an exemplary graph 1200 of FIG. 12 for disks depicts a trio of overall disk I/O level variables. The graph 1100 uses a log scale in the x axis, and thus the inflection points are described as: the descending shoulder of DISK_ACTIVITY_LOW is at 10 I/Os per second and the descending toe is at 50 I/Os per second; the ascending toe of DISK_ACTIVITY_MEDIUM is at 10 I/Os per second, the ascending shoulder is at 20 I/Os per second, the descending shoulder is at 50 I/Os per second, and the descending toe is at 100 I/Os per second; and the ascending toe of DISK_ACTIVITY_HIGH is at 20 I/Os per second and the ascending shoulder is at 100 I/Os per second.

The disk I/O graph 1200 illustrates a case of a fuzzy logic principle known as complementarity, in which the possibility values for any given input value add up to 1. In dividing up a universe of discourse, it is usually advantageous to divide it up logically. In this case, the sum of possibility, or membership, values for each point in the universe of discourse equals 1. As a programming caution, the CPU-related linguistic variables (e.g., CPU_UNDERUTILIZED, CPU_NORMAL, etc.) did not attempt the same division of values from 0 to 100%. However, by design, the CPU membership values from 75% to 100% (i.e., the three other than CPU_UNDERUTILIZED) illustrate complementarity. One skilled in the art will understand that the sum of the possibility values may be chosen as any value, and is not necessarily limited to a value of 1.

In a very natural way, the linguistic variables discussed above may be combined to draw conclusions or provide guidance. As an example, an expression combining linguistic variables may be derived as:

CPU_LIMITED=NOT CPU_NORMAL AND CPU_QUEUE_LONG AND NOT MEM_ISSUE AND DISK_ACTIVITY_LOW

Informally stated, one may conclude that the performance of a system is limited by the CPU if (a) the CPU utilization is pretty high, (b) the CPU queue is long, (c) there is no memory problem (e.g., a shortage), and (d) the disk activity is low (e.g., not high). (The schematic formula notation used herein generally assumes that the usual rules of evaluation precedence apply; that is, NOTs are evaluated first, then ANDs, then ORs.) The value of CPU_LIMITED will vary from 0.0 to 1.0 according to the values in the formula shown. One skilled in the art will recognize, however, that other precedence rules may be consistently applied, as well as ranges other than 0.0 to 1.0 without departing from the spirit of the present invention.

Another example, drawing from the Windows realm, may be formulated as:

MEM_LIMITED =MEM_SHORT AND CPU_UNDER_UTILIZED AND PAGING_HIGH

More informally stated, the performance of a system is being limited by the memory if (a) the amount of memory available is low, (b) the CPU is not being exercised heavily, and (c) the virtual memory hard page fault rate is high. One skilled in the art will be able to adapt similar formulas to many diverse needs.

Rounding out the three basic formulas:

DISK_IO_LIMITED =CPU_UNDERUTILIZED AND NOT MEM_SHORT AND DISK_ACTIVITY_HIGH AND (READS_SLOW OR WRITES_SLOW)

Informally, the performance of, for example, a Windows computer system may be limited by the disk subsystem if (a) the CPU is underutilized, (b) there is no shortage of memory, disk activity is "high" (e.g., by an interpretation in the context of that system), and (c) reads or writes are slow, relative to the disk subsystem.

As the last formula is somewhat simplistic, one skilled in the art may make appropriate adjustments for systems with a large number of disk arrays. The adjustment may, for example, take into account "hot spots," or arrays or subsystems that show symptoms of overload. Further, the formula implemented may also take into account the lengths of disk I/O queues.

Within a given disk subsystem, it is further possible to check for bottlenecks. As with a manual investigation, basic parameters of the subsystem, such as the number of physical drives in the subsystem and the maximum number of physical operations per second that a single drive can sustain, may be accessed. For a conservative analysis, the latter statistic may be located for random I/Os, which is typically lower than for sequential I/Os.

Figure 13:
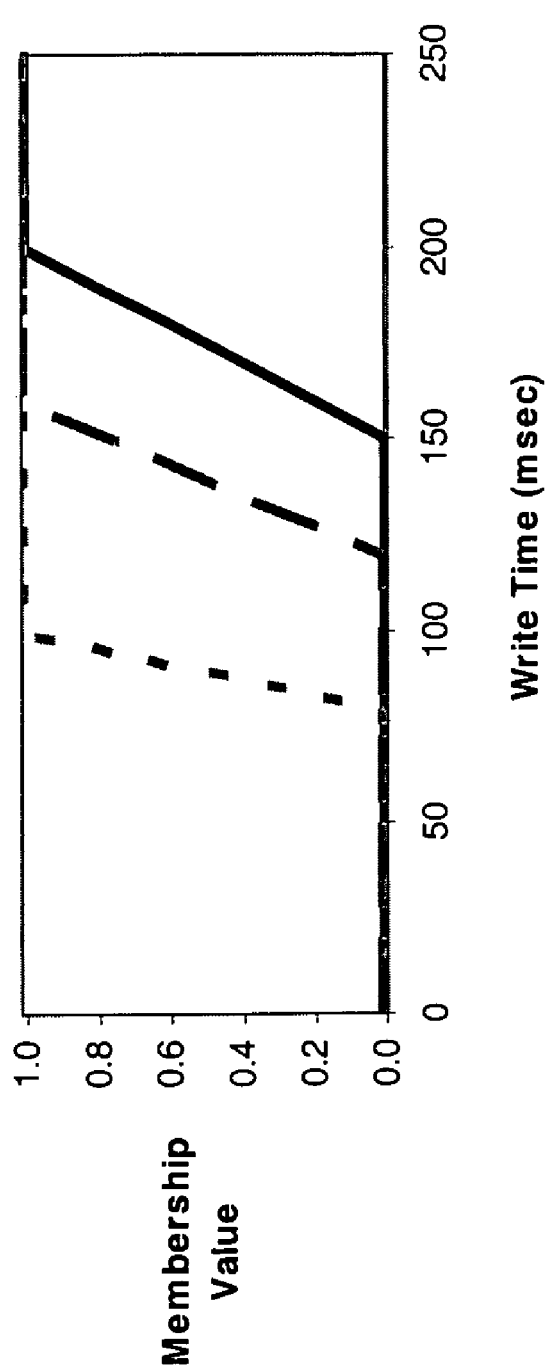
FIG. 13 depicts a graph illustrating an exemplary linguistic variable relating to I/O speeds for different drives of differing rotational speeds in accordance with an embodiment of the present invention.

To check for a cache bottleneck on a disk subsystem, a new exemplary linguistic variable, IOS_PER_SEC_CRITICAL may be created, reflecting when the number of I/Os per second per physical drive (e.g., combining reads and writes) is approaching or beyond critical. An exemplary graph 1300 of IOS_PER_SEC_CRITICAL for three different drives of differing rotational speeds, assuming 64KB average I/O units and random I/Os is depicted in FIG. 13.

The solid line of graph 1300 depicts 15,000 RPM drives, the line with long dashes depicts 10,000 RPM drives, and the line with short dashes depicts 7,200 RPM drives. The ascending toe and shoulder value pairs for these types of drives are, in order: (150, 200), (120, 160), and (80, 100).

Figure 14:
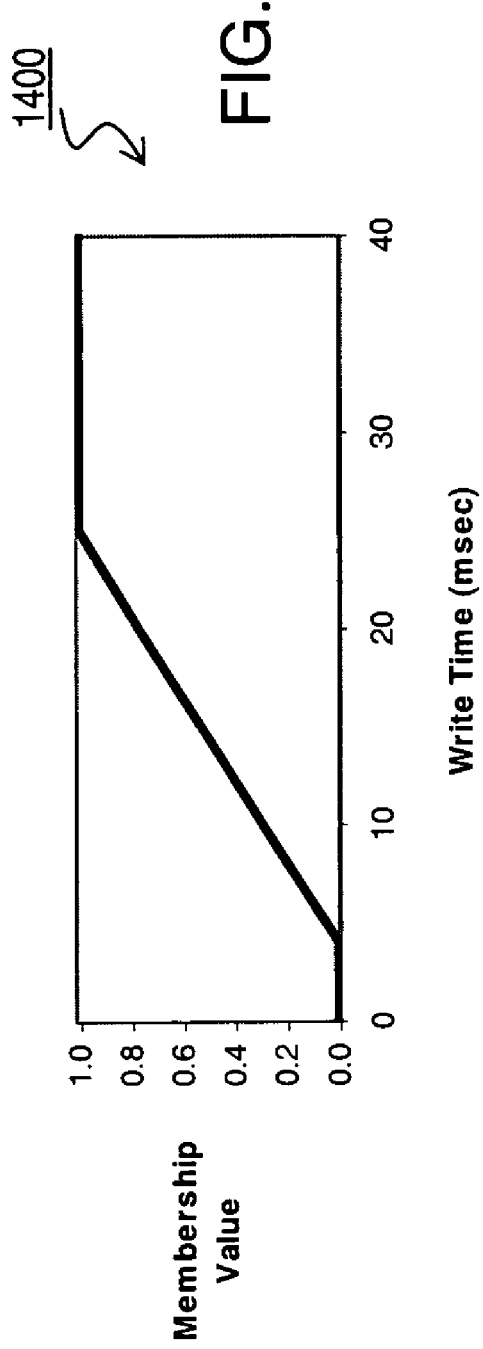
FIG. 14 depicts a graph illustrating an exemplary linguistic variable relating to cached writes in accordance with an embodiment of the present invention.

A slightly different membership value, CACHED_WRITES_SLOW, is created for disk write times, one more appropriate for evaluating cached write times; the toe and shoulder are 5 and 25, respectively, as shown in the exemplary graph 1400 of FIG. 14.

An exemplary schematic formula may then be expressed as:

CACHE_BOTTLENECK=CACHED_WRITES_SLOW AND IOS_PER_SEC_CRITICAL

This formula may be applied to both RAID 1 (i.e., mirrored) and RAID 5 (i.e., distributed parity) volumes equally. The calculation of IOS_PER_SEC_CRITICAL may thus take the array type into account.

If it is desired to detect a bottleneck at the disk drives in the same type of disk subsystem, then a test for slow reads and slow writes may be performed, additionally taking into account whether a number of physical I/Os per second per drive is being attempted that approaches the limits of the drives. An exemplary schematic formula for such detection may be derived as:

PHYS_DISK_BOTTLENECK=READS_VERY_SLOW AND WRITES_VERY_SLOW AND IOS_PER_SEC_CRITICAL

The very-slow variables presented herein may be used, or alternatively, new disk-slow variables may be created with toe and shoulder values positioned between the pairs presented herein.

Fuzzy logic may be used to characterize means, for example, one mean for each of thousands of servers, or to characterize samples (e.g., 1 minute, 15 minutes, etc.) for a single server; however, there is a difference between these uses. If many samples from a server are CPU-limited and many samples are I/O-limited, for example, upgrading only the CPU resource or only the disk resource risks not going far enough. Fuzzy logic advantageously enables evaluation of large numbers of samples in more depth and with more sensitivity than conventional techniques. More information is made available regarding the balance between CPU-limited samples and I/O-limited samples using fuzzy logic than with other techniques.

For example, considering the CPU-limited versus I/O-limited question for not one, but thousands of servers, conventionally, a scatter plot of the I/O rate versus the CPU utilization would be created. Such a technique is impractical for large numbers of servers. As shown herein, using fuzzy logic offers a better option that is fast, efficient, and scalable.

In most programming languages, it is neither practical nor wise to create a special function for each individual membership value calculation. It is more efficient to create a generalized function or macro to which one can supply the toe and shoulder values, then build other functions or macros that supply that function with the values.

The following discussion includes code samples written in SAS. One skilled in the art of data processing will recognize that many other languages are suitable, including at least C, C++, Perl, Fortran, and VBscript.

An exemplary SAS macro for the generic plateau function is shown in Table 2 as follows:

TABLE 2

```
%macro fmf_gen_plat(val, fmf, platmax,
    lo, lo_plat, hi_plat, hi);
    &fmf = 0; /* Default value */
    /* Exclude cases outside the toes. */
    IF (&val > &lo) AND (&val < &hi) THEN DO;
        &fmf = &platmax;
        /* Test for the upslope case.
        The plateau (flat top) case falls
        through both IF tests below! */
        IF (&val < &lo_plat) THEN DO;
        /* Up slope */
                IF ABS(&lo_plat - &lo) > 1.0 THEN
            UPSLOPE = &platmax /
            (&lo_plat - &lo);
                ELSE
                    UPSLOPE = 0;
                    &fmf = (&val - &lo) * UPSLOPE;
                END; /* end of DO above */
        /* Test for the downslope case. */
        ELSE IF (&val > &hi_plat) THEN DO;
            IF ABS(&hi - &hi_plat) > 1.0 THEN
            DOWNSLOPE = &platmax / (&hi - &hi_plat);
        ELSE
            DOWNSLOPE = 0;
            &fmf = &platmax - ((&val - &hi_plat)
                * DOWNSLOPE);
                END; /* end of DO above */
    END; /* end of outer IF DO; */
%mend;
```

As with any programming effort, a consistent set of prefixes and capitalization may be utilized when writing code for fuzzy logic to avoid confusion by the programmer. The convention used for the examples herein is akin to the so-called "Hungarian notation" developed by Charles Simonyi of Microsoft. Such a set of coding conventions may help prevent the coder from inserting a membership value variable where a real-world variable should be, as well as vice versa.

As a means of explaining the examples, the convention utilized in the code samples as shown herein uses a prefix of "fmf" for a fuzzy membership function, including macros like the one shown above. Fuzzy membership variables begin with the prefix "FM_" and are in all caps. Variables discussed in the text above are defined in the code, but have an FM_ prefix.

The fmf_gen_plat macro, designed to be invoked in a SAS DATA step by another macro of the type described below, divides the range of the incoming variable (val) into five brackets or cases: the first "horizon" (i.e., the flat part), the upslope, the plateau, the downslope, and the second horizon. The macro tests the incoming value and assigns a fuzzy membership value to the output variable accordingly. Consistent with SAS macro conventions, the construct &val denotes the variable name or string that was supplied at val's position in the argument list.

As exemplary arguments to be supplied to the fmf_gen_plat macro, val is the input value to be mapped to a membership value; fmf is the output membership value; platmax is the maximum output membership value (e.g., normally 1); lo is the ascending toe; lo_plat is the ascending shoulder; hi_plat is the descending shoulder; and hi is the descending toe.

The first IF statement assigns the output variable the default value, 0, for both horizon cases. The default value for the output variable is set next; if the incoming value is in the plateau range, none of the remaining IF tests are affirmed.

The second IF statement tests to see if the incoming variable is in the upslope range (e.g., less than lo_plat). After ensuring that division by zero will not occur, the code calculates the slope (i.e., UPSLOPE) and the resulting output variable.

The fourth IF statement (i.e., an ELSE IF) tests to see if the incoming value is in the downslope range (e.g., greater than hi_plat). If so, the code ensures that division by zero will not occur, calculates the slope (i.e., DOWNSLOPE) and the resulting output variable.

Figure 15:
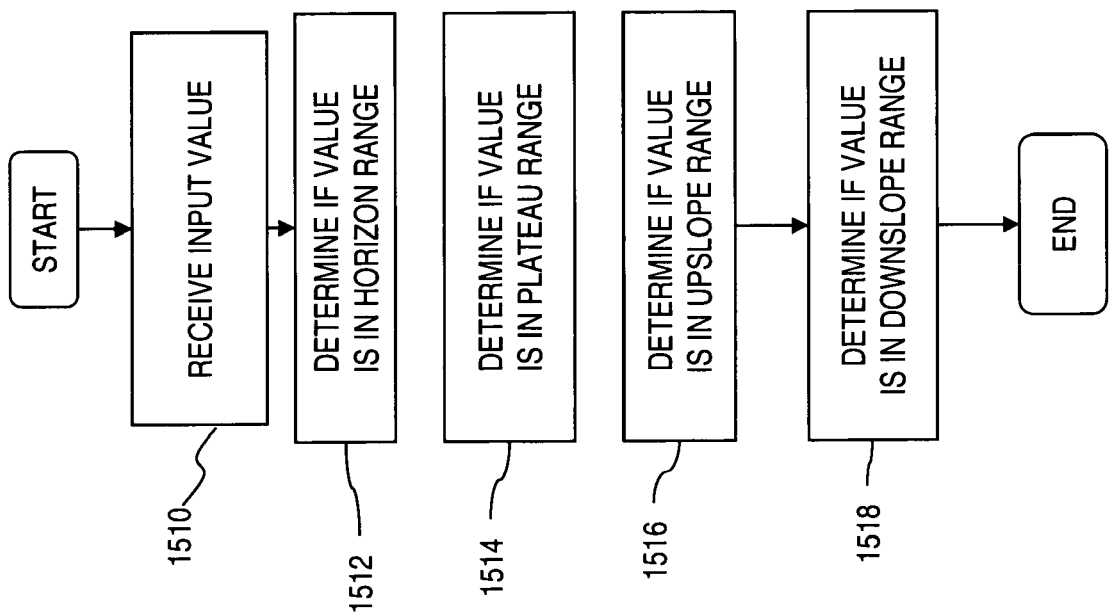
FIG. 15 is a data flow diagram of exemplary steps that may be performed by an exemplary to calculate a fuzzy membership function in accordance with an embodiment of the present invention.

FIG. 15 depicts a flow of steps for the code shown in Table 2. In step 1510, an input value is received for which a fuzzy membership value of the plateau function is desired. In step 1512, it is determined whether the value falls in the range of a horizon value, either the first horizon or the second horizon. In step 1514, it is determined whether the value falls in a plateau range. In step 1516, it is determined whether the value falls in an upslope range. In step 1518, it is determined whether the value falls in a downslope range. The result returned upon exit is the calculated membership value, based upon the determination of the range of the input value.

Table 3 below depicts exemplary macros which may serve as "wrappers" to the fmf_gen_plat macro, supplying actual toe and shoulder values. For example, a macro shown for providing the "platmax", "lo", "lo_plat", "hi_plat", and "hi" values to the fmf_gen_plat macro for a linguistic variable "CPUUNDERUTILIZED" supplies actual values of 1, 0, 0, 30, 50, respectively, while a macro for a linguistic variable "CPUVERYBUSY" supplies actual values of 1, 85, 95, 100, 100, respectively.

TABLE 3

```
%macro fmfCPUUNDERUTILIZED(val, fmx);
    %fmf_gen_plat(&val, &fmx, 1, 0, 0, 30, 50); %mend;
%macro fmfCPUNORMAL(val, fmx);
    %fmf_gen_plat(&val, &fmx, 1, 0, 0, 75, 85); %mend;
%macro fmfCPUBUSY(val, fmx);
    %fmf_gen_plat(&val, &fmx, 1, 75, 85, 85, 95); %mend;
%macro fmfCPUVERYBUSY(val, fmx);
    %fmf_gen_plat(&val, &fmx, 1, 85, 95, 100, 100); %mend;
%macro fmfCPUQUEUELONG(val, fmx);
    %fmf_gen_plat(&val, &fmx, 1, 1.5, 2.5, 9999999999,
        9999999999); %mend;
%macro fmfMEMSHORT(val, fmx);
    %fmf_gen_plat(&val, &fmx, 1, 0, 0, 10000000, 25000000);
    %mend;
%macro fmfPAGINGHIGH(val, fmx);
    %fmf_gen_plat(&val, &fmx, 1, 0, 5, 9999999999,
        9999999999); %mend;
%macro fmfREADSSLOW(val, fmx);
    %fmf_gen_plat(&val, &fmx, 1, 10, 20, 9999999999,
        9999999999); %mend;
%macro fmfREADSVERYSLOW(val, fmx);
    %fmf_gen_plat(&val, &fmx, 1, 25, 75, 9999999999,
        9999999999); %mend;
%macro fmfWRITESSLOW(val, fmx);
    %fmf_gen_plat(&val, &fmx, 1, 1.8, 8, 9999999999,
        9999999999); %mend;
%macro fmfWRITESVERYSLOW(val, fmx);
    %fmf_gen_plat(&val, &fmx, 1, 8.0, 20, 9999999999,
        9999999999); %mend;
%macro fmfDISKACTIVITYLOW(val, fmx);
    %fmf_gen_plat(&val, &fmx, 1, 0, 0, 15, 30); %mend;
%macro fmfDISKACTIVITYMED(val, fmx);
    %fmf_gen_plat(&val, &fmx, 0.5, 10, 20, 50, 100); %mend;
%macro fmfDISKACTIVITYHIGH(val, fmx);
    %fmf_gen_plat(&val, &fmx, 1, 100, 300, 9999999999,
        9999999999); %mend;
/* Version for 7200 RPM disk drives */
%macro fmfIOSPERSECCRITICAL(val, fmx);
    %fmf_gen_plat(&val, &fmx, 1, 80, 100, 9999999999,
        9999999999); %mend;
%macro fmfCACHEDWRITESSLOW(val, fmx);
    %fmf_gen_plat(&val, &fmx, 1, 5, 25, 9999999999,
        9999999999); %mend;
```

Table 4 depicts exemplary macros to provide fuzzy equivalents, as shown in Table 1, to logical operators AND, OR, and NOT:

TABLE 4

```
%macro fzyAND(op1, op2); MIN(&op1, &op2) %mend;
%macro fzyOR(op1, op2); MAX(&op1, &op2) %mend;
%macro fzyNOT(op1); (1 - &op1)
%mend;
```

It is noted that the exemplary fzyAND and fzyOR macros shown in Table 4 accept exactly two arguments and thus extended fuzzy AND and OR statements may require code different from that shown in the above example.

Table 5 depicts exemplary statements that invoke the wrapper macros as shown above, calculating exemplary basic membership functions:

TABLE 5

```
%fmfCPUUNDERUTILIZED(MEANCPU,
    FM_CPU_UNDERUTILIZED);
%fmfCPUNORMAL(MEANCPU, FM_CPU_NORMAL);
%fmfCPUBUSY(MEANCPU, FM_CPU_BUSY);
%fmfCPUVERYBUSY(MEANCPU, FM_CPU_VERY_BUSY);
```

TABLE 5-continued

```
%fmfCPUQUEUELONG(MEANCPUQ,FM_CPU_QUEUE_LONG);
%fmfMEMSHORT(MENAVLBT, FM_MEM_SHORT);
%fmfPAGINGHIGH(MENPAGIN, FM_PAGING_HIGH);
%fmfREADSSLOW (MEANREADTIME, FM_READS_SLOW);
%fmfREADSVERYSLOW(MEANREADTIME,
    FM_READS_VERY_SLOW);
%fmfWRITESSLOW(MEANWRITETIME,FM_WRITES_SLOW);
%fmfWRITESVERYSLOW(MEANWRITETIME,
    FM_WRITES_VERY_SLOW);
%fmfDISKACTIVITYLOW (TOTALIOS,
    FM_DISK_ACTIVITY_LOW);
%fmfDISKACTIVITYMED (TOTALIOS,
    FM_DISK_ACTIVITY_MED);
%fmfDISKACTIVITYHIGH(TOTALIOS,
    FM_DISK_ACTIVITY_HIGH);
%fmfIOSPERSECCRITICAL(TOTALIOS,
    FM_IOS_PER_SEC_CRITICAL);
%fmfCACHEDWRITESSLOW(MEANWRITETIME,
    FM_CACHED_WRITES_SLOW);
```

The variables used in the code depicted in Table 5 are intuitive and more or less self-explanatory: for example, MEANCPU is the mean CPU utilization, MEANCPUQ is the mean CPU queue length, MENAVLBT is the mean available bytes of memory, and MENPAGIN is the mean input pages per second (i.e, hard page faults).

Table 6 depicts exemplary statements to create exemplary linguistic variables based on membership values as calculated above:

TABLE 6

```
FM_MEM_ISSUE = %fzyAND(FM_MEM_SHORT,
    FM_PAGING_HIGH);
FM_CPU_LIMITED = MIN(%fzyNOT(FM_CPU_NORMAL),
    FM_CPU_QUEUE_LONG, %fzyNOT(FM_MEM_ISSUE),
    FM_DISK_ACTIVITY_LOW);
FM_MEM_LIMITED = MIN(FM_MEM_SHORT,
    FM_CPU_UNDERUTILIZED, FM_PAGING_HIGH);
FM_DISK_IO_LIMITED = MIN(
    FM_CPU_UNDERUTILIZED,
    %fzyNOT(FM_MEM_SHORT),
    FM_DISK_ACTIVITY_HIGH,
    %fzyOR(FM_READS_SLOW, FM_WRITES_SLOW));
FM_CACHE_BOTTLENECK =%fzyAND(
    FM_CACHED_WRITES_SLOW,
    FM_IOS_PER_SEC_CRITICAL);
FM_PHYS_DISK_BOTTLENECK = MIN(
    FM_READS_VERY_SLOW,
    FM_WRITES_VERY_SLOW,
    FM_IOS_PER_SEC_CRITICAL);
```

For example, a memory issue is defined as a fuzzy "AND" of "MEM_SHORT" and "PAGING_HIGH." A value of a linguistic variable for "CPU_LIMITED" is defined as a minimum of the values of NOT "CPU_NORMAL," CPU_QUEUE_LONG," and NOT "MEM_ISSUE." Further, a value of a linguistic variable denoting a physical disk bottleneck is defined as a minimum value of "READS_VERY_SLOW," "WRITES_VERY_SLOW," and "IOS_PER_SEC_CRITICAL." Thus, complex decisions may be easily resolved by combining values of linguistic variables that have been carefully processed and coded using values that may be intuitively selected.

One skilled in the art of data processing will appreciate that code may easily be created that tests each of the fuzzy membership values against a threshold (i.e., defuzzify) and outputs desired variables for each selected observation, for example, of a resource or server.

One skilled in the art of data processing will also appreciate that numerous other measures of system effectiveness may be considered for performance analysis in addition to those discussed above. For example, response time and/or throughput are exemplary measures which may also be characterized by fuzzy membership values and/or linguistic variables for use in analyzing performance of systems and resources.

Consistent with systems, methods, and software for analyzing performance data of systems using fuzzy logic described herein, given almost any application wherein there are multiple factors or elements consumed within a resource (e.g., CPU, memory, disk I/O for computer systems), there exist a large number of items in the population under consideration for analysis, and automation and efficient computation are desirable, the techniques described herein may be advantageously applied. Numerous other types of applications such as, for example, management information systems that analyze performance of company units, for example, departments or divisions, consume resources of various types, produce outputs, and are present in large numbers in corporations, and thus may advantageously utilize the systems, methods, and software for analyzing performance data of systems using fuzzy logic described herein.

HARDWARE OVERVIEW

Figure 16:
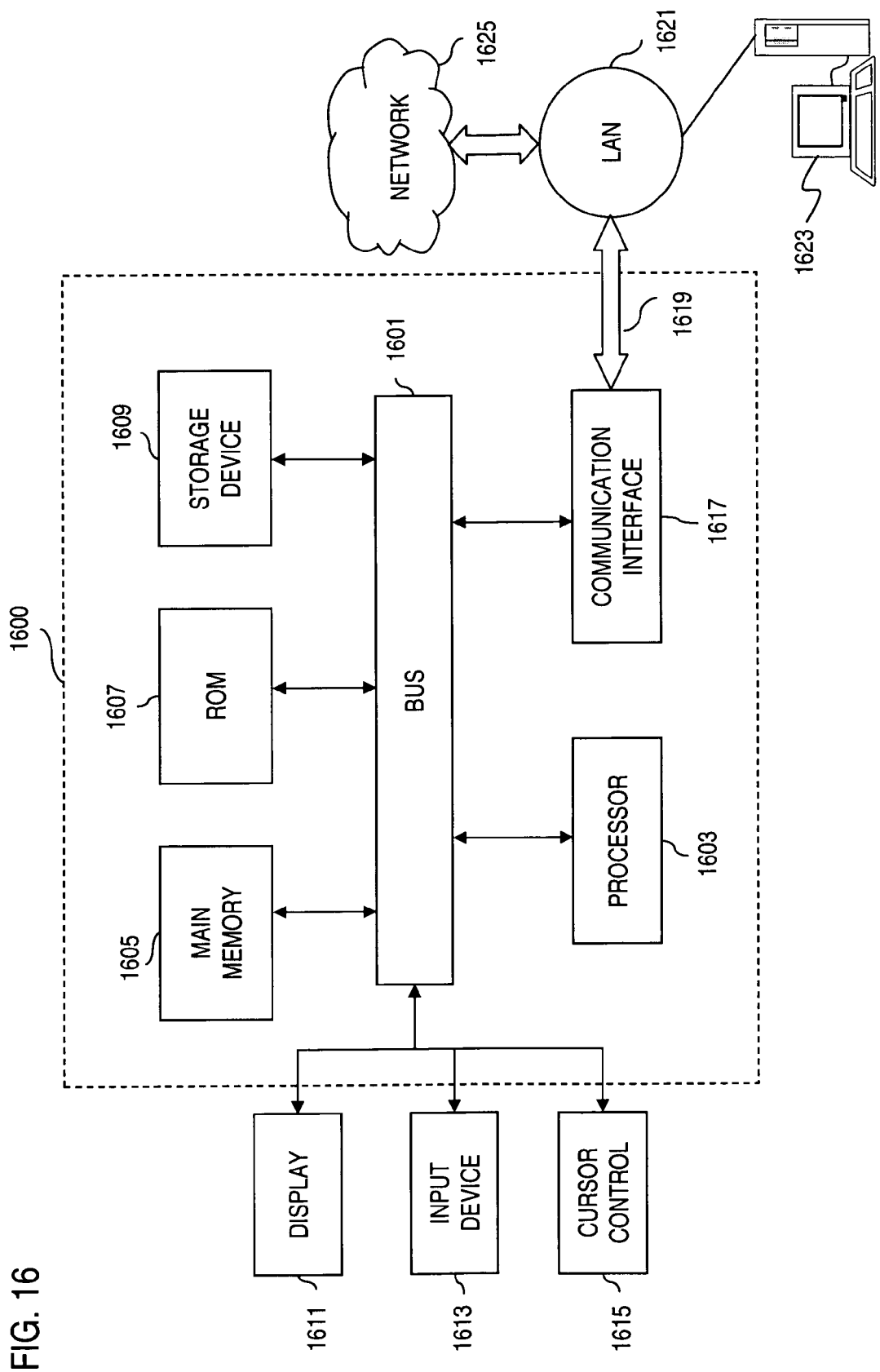
FIG. 16 depicts a computer system that can be used to implement an embodiment of the present invention.

FIG. 16 illustrates a computer system 1600 upon which an embodiment according to the present invention can be implemented. For example, the performance analyzer 104 may be implemented using such a computer system 1600, and may be used to analyze performance of resources, or elements, of other such computer systems 1600. The computer system 1600 includes a bus 1601 or other communication mechanism for communicating information and a processor 1603 coupled to the bus 1601 for processing information. The computer system 1600 also includes main memory 1605, such as a random access memory (RAM) or other dynamic storage device, coupled to the bus 1601 for storing information and instructions to be executed by the processor 1603. Main memory 1605 can also be used for storing temporary variables or other intermediate information during execution of instructions by the processor 1603. The computer system 1600 may further include a read only memory (ROM) 1607 or other static storage device coupled to the bus 1601 for storing static information and instructions for the processor 1603. A storage device 1609, such as a magnetic disk or optical disk, is coupled to the bus 1601 for persistently storing information and instructions.

The computer system 1600 may be coupled via the bus 1601 to a display 1611, such as a cathode ray tube (CRT), liquid crystal display, active matrix display, or plasma display, for displaying information to a computer user. An input device 1613, such as a keyboard including alphanumeric and other keys, is coupled to the bus 1601 for communicating information and command selections to the processor 1603. Another type of user input device is a cursor control 1615, such as a mouse, a trackball, or cursor direction keys, for communicating direction information and command selections to the processor 1603 and for controlling cursor movement on the display 1611.

According to one embodiment of the invention, fuzzy performance analysis is provided by the computer system 1600 in response to the processor 1603 executing an arrangement of instructions contained in main memory 1605. Such instructions can be read into main memory 1605 from another computer-readable medium, such as the storage device 1609. Execution of the arrangement of instructions contained in main memory 1605 causes the processor 1603 to perform the process steps described herein. One or more processors in a multi-processing arrangement may also be employed to execute the instructions contained in main memory 1605. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 1600 also includes a communication interface 1617 coupled to bus 1601. The communication interface 1617 provides a two-way data communication coupling to a network link 1619 connected to a local network 1621. For example, the communication interface 1617 may be a digital subscriber line (DSL) card or modem, an integrated services digital network (ISDN) card, a cable modem, a telephone modem, or any other communication interface to provide a data communication connection to a corresponding type of communication line. As another example, communication interface 1617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1617 sends and receives electrical, electromagnetic, or optical signals that carry digital data streams representing various types of information. Further, the communication interface 1617 can include peripheral interface devices, such as a Universal Serial Bus (USB) interface, a PCMCIA (Personal Computer Memory Card International Association) interface, etc. Although a single communication interface 1617 is depicted in FIG. 16, multiple communication interfaces can also be employed.

The network link 1619 typically provides data communication through one or more networks to other data devices. For example, the network link 1619 may provide a connection through local network 1621 to a host computer 1623, which has connectivity to a network 1625 (e.g. a wide area network (WAN) or the global packet data communication network now commonly referred to as the "Internet") or to data equipment operated by a service provider. The local network 1621 and the network 1625 both use electrical, electromagnetic, or optical signals to convey information and instructions. The signals through the various networks and the signals on the network link 1619 and through the communication interface 1617, which communicate digital data with the computer system 1600, are exemplary forms of carrier waves bearing the information and instructions.

The computer system 1600 can send messages and receive data, including program code, through the network(s), the network link 1619, and the communication interface 1617. In the Internet example, a server (not shown) might transmit requested code belonging to an application program for implementing an embodiment of the present invention through the network 1625, the local network 1621 and the communication interface 1617. The processor 1603 may execute the transmitted code while being received and/or store the code in the storage device 1609, or other non-volatile storage for later execution. In this manner, the computer system 1600 may obtain application code in the form of a carrier wave.

The term "computer-readable medium" as used herein refers to any medium that participates in providing instructions to the processor 1603 for execution. Such a medium may take many forms, including but not limited to non-volatile media, volatile media, and transmission media. Non-volatile media include, for example, optical or magnetic disks, such as the storage device 1609. Volatile media include dynamic memory, such as main memory 1605. Transmission media include coaxial cables, copper wire and fiber optics, including the wires that comprise the bus 1601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

CONCLUSION

Accordingly, a system, method, and software for analyzing performance data of a telecommunications system using fuzzy logic advantageously enables automated performance evaluation of batches of tests which obtain performance data for a large number of devices (e.g., server boxes, routers, and the like). Fuzzy membership functions, which may include hedge functions, are applied to the performance data, thereby eliminating the need for hard cut-off values, and eliminating or minimizing a need for human intervention.

While the present invention has been described in connection with a number of embodiments and implementations, the present invention is not so limited but covers various obvious modifications and equivalent arrangements, which fall within the purview of the appended claims.

What is claimed is:

1. A method for analyzing performance of a system including at least one resource, the method comprising:
   receiving performance data associated with the resource;
   determining fuzzified performance data based on the received performance data;
   determining linguistic variable values associated with the resource;
   combining the linguistic variable values; and determining defuzzified results based on a result of the combining step;

wherein the resource includes at least one of a disk drive, a processor, a server, an input/output (I/O) device, a call center resource, a memory, a telecommunications switch or a network node.

2. A method according to claim 1, wherein the step of combining the linguistic variable values includes combining the linguistic variable values based on at least one fuzzy logical operator.

3. A method according to claim 2, wherein the fuzzy logical operator includes at least one of a fuzzy AND operator, a fuzzy OR operator, or a fuzzy NOT operator.

4. A method according to claim 1, wherein the step of determining fuzzified performance data includes determining membership values of fuzzy sets associated with the performance data.

5. A device for analyzing performance of a system including a plurality of resources, the device comprising:

a performance analyzer configured to receive performance data associated with each one of the plurality of resources, determine fuzzified performance data based on the received performance data, and determine linguistic variable values associated with the plurality of resources; and a performance analyzer interface configured to interface with the system and the performance analyzer;

wherein the resources include at least one of a disk drive, a processor, a server, an input/output (I/O) device, a call center resource, a memory, a telecommunications switch or a network node.

6. A device according to claim 5, wherein the performance analyzer is further configured to combine the linguistic variable values and determine defuzzified results based on a result of the combining step.

7. A device according to claim 6, wherein the step of combining the linguistic variable values includes combining the linguistic variable values based on at least one fuzzy logical operator.

8. A device according to claim 7, wherein the fuzzy logical operator includes at least one of a fuzzy AND operator, a fuzzy OR operator, or a fuzzy NOT operator.

9. A device according to claim 5, wherein the step of determining fuzzified performance data includes determining membership values of fuzzy sets associated with the performance data.

10. A performance analyzer comprising:

means for receiving performance data associated with a resource;

means for determining fuzzified performance data based on the received performance data; and means for determining linguistic variable values associated with the resource;

wherein the resource includes at least one of a disk drive, a processor, a server, an input/output (I/O) device, a call center resource, a memory, a telecommunications switch or a network node.

11. A performance analyzer according to claim 10, further comprising:

means for combining the linguistic variable values; and means for determining defuzzified results based on a result of the combination.

12. A performance analyzer according to claim 11, wherein the combining means combines the linguistic variable values based on at least one fuzzy logical operator.

13. A performance analyzer according to claim 12, wherein the fuzzy logical operator includes at least one of a fuzzy AND operator, a fuzzy OR operator, or a fuzzy NOT operator.

14. A fuzzy telecommunications performance analysis system for analyzing performance of a telecommunications system including at least one call center, each call center including a plurality of resources, the performance analysis system comprising:

a performance analyzer configured to receive performance data associated with each one of the plurality of resources, determine fuzzified performance data based on the received performance data, and determine linguistic variable values associated with the plurality of resources; and a network management system configured to interface with the call center and the performance analyzer; the resource includes at least one of a disk drive, a processor, a server, an input/output (I/O) device, a call center resource, a memory, a telecommunications switch or a network node.

15. A fuzzy telecommunications performance analysis system according to claim 14, wherein the performance analyzer is configured to combine the linguistic variable values and to determine defuzzified results based on a result of the combined linguistic variable values.

16. A fuzzy telecommunications performance analysis system according to claim 15, wherein the linguistic variable values are combined according to at least one fuzzy logical operator.

17. A fuzzy telecommunications performance analysis system according to claim 16, wherein the fuzzy logical operator includes at least one of a fuzzy AND operator, a fuzzy OR operator, or a fuzzy NOT operator.

18. A fuzzy telecommunications performance analysis system according to claim 14, wherein the performance analyzer determines membership values of fuzzy sets associated with the performance data.

19. A fuzzy telecommunications performance analysis system according to claim 14, wherein the performance analyzer determines membership values of hedge functions of fuzzy sets associated with the performance data.

* * * * *